United States Patent [19]
Erickson

[11] 4,363,063
[45] Dec. 7, 1982

[54] LOAD BREAK SWITCH WITH BUILT-IN GROUND FAULT SENSING

[75] Inventor: John W. Erickson, Crystal Lake, Ill.

[73] Assignee: Boltswitch, Inc., Crystal Lake, Ill.

[21] Appl. No.: 290,370

[22] Filed: Aug. 5, 1981

[51] Int. Cl.³ .............................................. H02H 3/28
[52] U.S. Cl. ..................................... 361/48; 335/18;
361/347
[58] Field of Search ................... 361/42, 44, 46, 347;
335/18

[56] References Cited

U.S. PATENT DOCUMENTS 3,505,566  4/1970  Conrad ................................. 361/44
3,582,595  6/1971  Stene ................................. 335/171 X
4,172,271 10/1979  Hobson, Jr. ...................... 361/44 X Primary Examiner—Harry E. Moose, Jr.
Attorney, Agent, or Firm—Kinzer, Plyer, Dorn & McEachran

[57] ABSTRACT

A plural phase high current low voltage load break switch with built-in ground fault sensing comprises an insulator base and a plurality of individual phase circuits mounted on and extending across the base in parallel spaced relation to each other, each phase circuit including, in series, an input connector, a fixed switch contact, a movable switch contact, a fuse, and an output conductor; a neutral conductor is mounted on and extends across the base in parallel spaced relation to the phase circuits. A switch operator mechanism mounted on the base is connected to all of the movable switch contacts for opening and closing these contacts simultaneously; that mechanism includes an electrically operated trip actuator for actuating the operator mechanism to open the switch contacts. A zero sequence ground fault sensor coil is disposed in encompassing relation to all of the phase circuits and the neutal conductor; the sensor coil is aligned with the movable switch contacts. A control relay is electrically connected to the ground fault sensor coil and to the trip actuator for energizing the trip actuator in response to the sensing of a ground fault condition by the sensor coil.

3 Claims, 3 Drawing Figures

LOAD BREAK SWITCH WITH BUILT-IN GROUND FAULT SENSING

BACKGROUND OF THE INVENTION

This invention relates to a built-in zero sequence ground fault indicator for a bolted-pressure contact switch.

Fused load-break switches are frequently used as service entrance equipment and in other relatively high current applications. Typically, multi-pole switches of this kind may be required to interrupt currents of 400 to 4,000 amperes. Most switches of this kind are provided with positive pressure-applying mechanisms for assuring good contact between the switch terminals. The contacts of these switches are opened and closed rapidly to minimize arcing and thereby avoid pitting and deterioration of the switch contacts. Rapid opening and closing of the switch contacts have been accomplished by the use of an over center spring drive. The spring drive can be energized and the switch actuated by manual or electrical means. The manual or electrical means is not used directly to open or close the switch contacts but instead operates a trip mechanism to release the spring drive. Switches of this type have also been equipped with electrical means such as electrical motors or solenoids to actuate the switch and energize the spring drive, thereby permitting remote operation of the switch.

In order to sense low level ground faults, bolted-pressure contact switches have been equipped with ground fault sensing mechanisms. However, this has required that the terminals of the switch be extended to accomodate the sensor and has also necessitated rearrangement of the bus bars. For these reasons, standard housings for bolted-pressure contact switches have not been usable with ground fault sensing without extensive modification of the switch housings.

SUMMARY OF THE INVENTION

It is an object of the present invention, therefore, to provide a bolted-pressure contact switch with a built-in ground fault sensing system which can be installed in a standard size switch housing.

A further object of the invention is to provide a bolted-pressure contact switch with an integral ground fault sensing system which will not necessitate the rearrangement of the electrical bus bars.

Another object of the invention is to provide a ground fault sensor for a high current, low voltage, load-break switch which sensor is located in the movable blade area of the switch but does not interfere with the operation of the switch.

Accordingly, the invention relates to a high current, low voltage, load-break switch of the type which is mounted on an insulator base in a housing. The switch has a plurality of individual phase circuits mounted on and extending across the insulator base, in parallel spaced relation to each other. Each phase circuit includes, in series, a line connector, a fixed switch contact, a movable switch contact, a fuse, and an output connector. A neutral conductor is mounted on and extends across the base in parallel spaced relation to the phase circuits. A switch operator mechanism is mounted on the base and connected to all of the movable switch contacts for opening and closing such contacts simultaneously. The switch operator mechanism includes an electrically operated trip actuator for actuating the operator mechanism to open the switch contacts. A zero sequence ground fault sensor coil is disposed in encompassing relation to all of the phase circuits and the neutral conductor. The ground fault sensor coil is aligned with and encompasses the portions of the phase circuits comprising the movable contacts. A control relay is electrically connected to the ground fault sensor coil and to the trip actuator for energizing the trip actuator in response to the sensing of a ground fault condition.

DESCRIPTION OF THE PREFERRED EMBODIMENT

Figure 2:
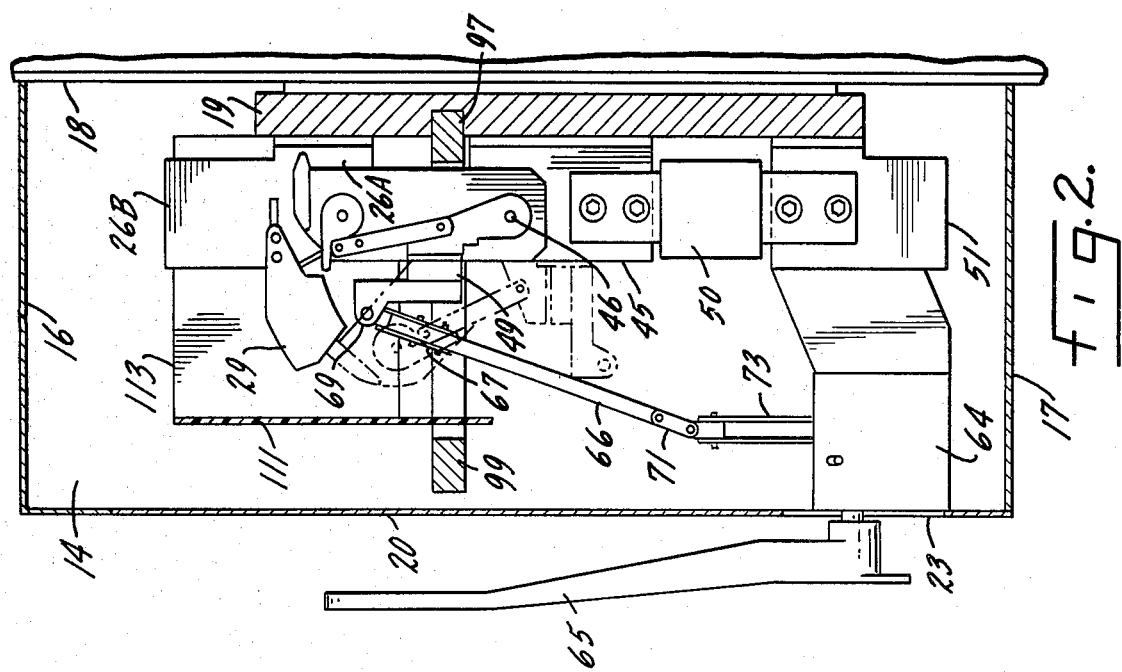
FIG. 2 is a vertical cross sectional view taken through the switch housing and showing the closed position of the switch contacts.
Figure 1:
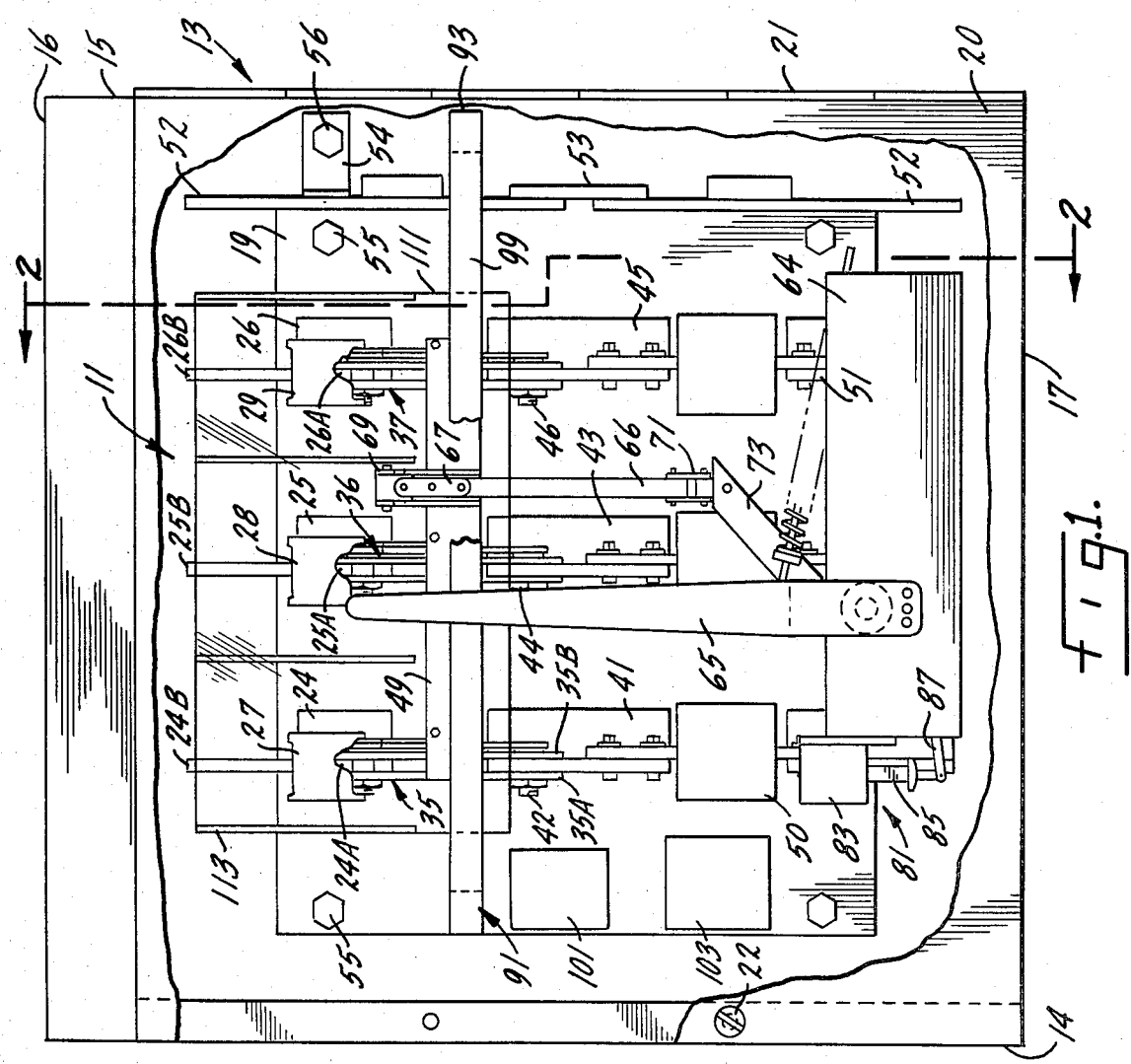
FIG. 1 is a front elevation view of a housing containing a top feed load-break switch constructed in accordance with the present invention, with parts of the switch housing broken away for clarity of illustration.

FIGS. 1 and 2 illustrate a high-current, low-voltage load-break switch 11 which is installed in a metal housing 13 of conventional construction and conventional size for each capacity switch. The housing 13 includes side walls 14 and 15, a top wall 16 and a bottom wall 17, all of which are formed conventionally of sheet metal. An incombustible frame member 18 is located at the rear of the housing. A base member 19 of insulating material on which the switch 11 is mounted is attached to the frame member 18. A door 20 located at the front of the housing is hingedly connected thereto along one vertical edge 21. The door 20 is secured in its closed position relative to the cabinet by screws 22 or otherwise suitable fastening means. The door 20 is usually equipped with an opening 23 for the operating handle, target indicators, etc.

In FIGS. 1 and 2 of the drawings, a load-break switch 11 of known construction is shown in its closed position. Across the top of the insulating base 19, there are mounted three fixed contacts 24, 25 and 26 provided with outwardly projecting contact blades 24A, 25A and 26A respectively; and each fixed contact is provided with an individual line connection terminal lug 24B, 25B and 26B respectively. Three arc chutes 27, 28 and 29 are mounted on the fixed contacts 24, 25 and 26, respectively. A suitable arc chute is shown in U.S. Pat. No. 3,441,699, but the invention should not be limited to the use of the particular construction shown in that patent, which is merely illustrative of one of a number of different forms of arc chutes which may be used.

Each of the fixed contacts 24, 25 and 26 is one element of a pole of the switch 11. Contacts 24, 25 and 26 are each engageable by a respective one of three movable contacts 35, 36 and 37. Each movable contact comprises a pair of contact blades, such as the blades 35A and 35B of movable contact 35. Movable contacts 35, 36 and 37 are pivotally mounted upon electrical connector brackets 41, 43 and 45, respectively, by means of suitable pivot members 42, 44 and 46 respectively.

Switch 11 further includes an actuating bar 49 that extends transversely of the switch and is connected to each of the movable contacts 35, 36 and 37 by means of a connecting linkage, so that pivotal movement of the bar 49 with respect to the aligned pivot members drives the movable contacts of the switch to move pivotally in and out of engagement with the fixed contacts 24, 25 and 26. Switch 11 is also provided with appropriate overload fuses 50 and electrical lugs 51 to afford a means to complete electrical connections from the movable switch contacts to the load circuits served by the switch. Each set of a line terminal, a fixed contact, a movable contact, a fuse 50 and a lug 51 constitutes a phase circuit.

A neutral conductor 52 is mounted on the base member 19 in parallel spaced relation to the three phase circuits 51 of the switch 11. A removable connector link 53 may be provided in the neutral conductor 52 for testing purposes. A bond strap 54 is secured to the neutral conductor 52 at the line side of the switch. Preferably, the bond strap 54 is aligned with the upper mounting holes in the base 19 that receive mounting bolts 55, so that if the switch is mounted on horizontal rails (not shown) it is a simple matter to ground the neutral conductor 52 to the switchboard frame, as by means of a bolt 56.

A trip-free switch operator mechanism 64 of the type described and claimed in U.S. Pat. No. 3,582,595 is also provided. The switch operator mechanism 64 is equipped with an over center spring drive which is actuated when rotation of the main drive shaft is initiated in either the switch opening or switch closing direction. Initial rotation of the main drive shaft in the switch opening direction is accomplished by a switch opening energy storage spring which is charged during closing motion of the switch. A manually operable handle 65 is provided to initiate actuation of the switch operator mechanism.

The actuating bar 49 of switch 11 is connected to an operating rod 66 by means of a pivotal connection 67. More specifically, rod 66 has its upper end affixed to an upper yoke 69 and its lower end secured to a lower yoke 71. Lower yoke 71 is pivotally connected to an operating lever 73 that is a part of the switch operator mechanism 64. In FIGS. 1 and 2, operating lever 73 is shown in its upper or closed switch position. Opening of the switch 11 is effected by the lever 73, which turns in a clockwise direction (FIG. 1) and pulls operating rod 66 downwardly to thereby pivot actuating bar 49 outwardly and away from the insulated base 19. The pivotal movement of bar 49 simultaneously pivots the movable contacts 35, 36 and 37 outwardly from the fixed contacts 24, 25 and 26 and thus opens the switch. The open position of the actuating bar 49 and the movable contacts is shown in phantom lines in FIG. 2.

An insulating shield 111, preferably transparent, is positioned in the front of the switch contacts and is supported in this position on insulating shields or partitions 113 which are located between and on the sides of the switch contacts 35, 36 and 37. The transparent shield extends downwardly to a level below the closed position of the switch actuating bar 49. The transparent shield is located inside the metal housing 13 where it is protected against mechanical injury and damage and is also relatively protected against dirt and fumes which could reduce the transparency thereof.

The trip-free switch operator mechanism 64 includes an actuator mechanism 81 having a solenoid 83 that is mounted externally of the mechanism 54. The solenoid includes a downwardly extending armature 85. The lower end of armature 85 is pivotally connected to one end of a lever 87. The lever 87 is arranged in the same manner as the lever 103 described in U.S. Pat. No. 3,582,595 so as to actuate the operator mechanism 64 of the switch when the solenoid is energized. When energized, armature 85 is pulled upwardly to release the switch to actuate the switch operator mechanism 64 independently of movement of the handle 65.

The trip solenoid 83 is connected to a zero sequence ground fault sensor 91. The ground fault sensor 91 includes a sensor or current monitor coil 93 which is positioned in the switch box housing 13 where it surrounds and is aligned with the movable contacts 35, 36 and 37 of the switch. In this example, the current monitor coil 93 is rectangular in shape with a rectangular window 95 through which the three phase conductors and the neutral conductor 52 all pass. The current monitor is an insulated unit which is positioned with one of its longer legs 97 mounted on the insulated base 19 of the switch housing and its other longer leg 99 positioned in front of the transparent shield 111. The current monitor is thus positioned in encompassing aligned relation with the movable contacts 35, 36 and 37 of the switch 11. In this location, the sensor does not interfere with the operation of the movable contacts of the switch, nor does it interfere with visual observation of the switch condition.

Figure 3:
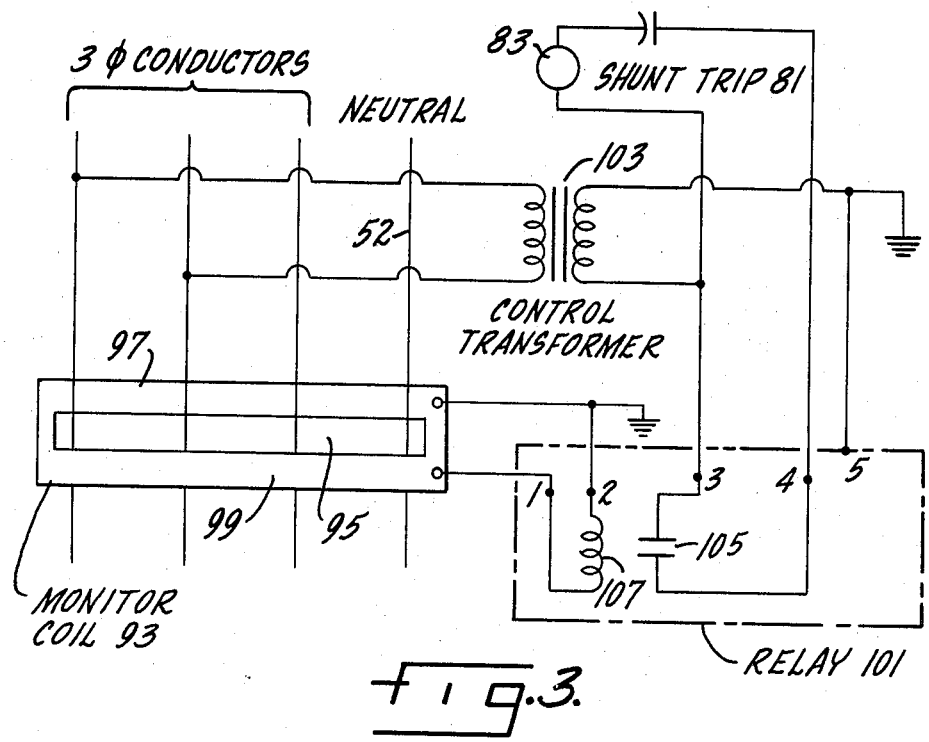
FIG. 3 is a schematic showing the electrical circuits of the load-break switch and the integral ground fault sensing element.

As shown in FIGS. 1 and 3, the trip solenoid 83 is electrically connected to a relay 101 and to a control transformer 103 that are incorporated in the ground fault sensor 91. Relay 101, though shown schematically in FIG. 3 like a mechanical relay, for convenience of illustration and explanation, should be a solid-state relay to assure adequate speed of operation. Thus, the primary winding of control transformer 103 is connected to two of the three phase conductors of the switch 11. One terminal of the secondary winding of the control transformer is connected to solenoid 83 and the other terminal of the control transformer secondary is connected to ground. A pair of normally open contacts 105 in relay 101 are connected in the circuit comprising solenoid 83 and the secondary of the transformer 103.

The relay 101 includes an operating coil 107. One terminal of coil 107 is connected to a first terminal of the monitor coil 93. One terminal of each of the coils 93 and 107 is connected to ground.

In operation, as long as the currents to the load served by the switch are confined to the three phase conductors and the neutral conductor 52, there is negligible current developed in the sensor coil 93 of the ground fault sensor 91 and, accordingly, no appreciable energizing current in the operating portion of the relay 101, shown as the coil 107. This is the condition that obtains for normal operation of the circuits energized through switch 11.

Whenever a ground fault occurs in any of the load circuits connected to the load connector lugs 51, however, the normal balanced condition for the electrical currents in the conductors passing through the sensor coil 93 is disrupted because a part of the current now flows through the bonding strap 54, bypassing the sensor coil. Accordingly, an appreciable current is developed in the sensor coil 93, and is applied to the operating coil 107 of the relay 101. As a consequence, the relay contacts 105 are closed, completing an electrical circuit from the secondary of the control transformer 103 to the trip solenoid 83. Thus, for such a ground fault condition, the trip solenoid 83 is energized and the switch is opened as described above.

From the foregoing description, and the drawings, it will be apparent that the construction provided by the present invention imposes no requirement for increasing any dimension of the housing of the switch 11. The overall height remains the same, even though a removable test link may be incorporated in the neutral conductor, and a bond strap is provided on the power line side of the neutral. The overall width of the switch remains unchanged. Thus, the switch can be directly retrofit in housings used for switches not equipped with ground fault sensing. Moreover, on new installations space requirements are kept to a minimum.

Switch 11, as illustrated, is a top feed switch, with line connections made at the terminals 24B–26B and load connections at the lugs 51. As will be apparent, however, the ground fault sensing arrangement of the invention can be applied equally to a bottom feed switch of inverted construction. In either case the bond strap 54, or any external grounding connection for the neutral, must be located ahead of the sensor coil 93.

I claim:

1. A plural phase high current low voltage load break switch comprising:

an insulator base;

a plurality of individual phase circuits mounted on and extending across the base, in parallel spaced relation to each other, each phase circuit including in series an input connector, a fixed switch contact, a movable switch contact, a fuse, and an output connector;

a neutral conductor mounted on and extending across the base in parallel spaced relation to the phase circuits;

a switch operator mechanism, mounted on the base and connected to all of the movable switch contacts, for opening and closing such contacts simultaneously, the switch operator mechanism including an electrically operated trip actuator for actuating the operator mechanism to open the switch contacts;

a zero sequence ground fault sensor coil disposed in encompassing relation to all of the phase circuits and the neutral conductor, the ground fault sensor coil being aligned with and encompassing the portions of the phase circuits comprising the movable contacts of the switch; and a control relay, electrically connected to the ground fault sensor coil and to the trip actuator, for energizing the trip actuator in response to the sensing of a ground fault condition by the sensor coil.

2. A low voltage load break switch according to claim 1, in which the insulator base includes mounting holes for mounting the switch on a switchboard frame or like structure, and further comprising a bond strap, affixed to the line connection end of the neutral conductor and aligned with one of the mounting holes in the insulator base to provide for convenient and effective grounding of the line connection end of the neutral conductor.

3. A low voltage load break switch according to claim 1 or claim 2 and further comprising a removable test connector link interposed in series in the neutral conductor.

* * * * *